ARTICLE FEEDING APPARATUS

Filed July 10, 1956 9 Sheets-Sheet 1

INVENTOR.
Kurt R. Schneider
Kurt Hein and
Walter Hein
BY
Mason, Porter, Diller & Stewart,
attorneys.

ARTICLE FEEDING APPARATUS

Filed July 10, 1956 9 Sheets-Sheet 2

INVENTOR.
Kurt R. Schneider
Kurt Hein and
Walter Hein

BY Mason, Porter, Diller & Stewart,
Attorneys.

INVENTOR.
Kurt R. Schneider
Kurt Hein and
Walter Hein
BY
Mason, Porter, Diller & Stewart
Attorneys.

INVENTOR.
Kurt R. Schneider
Kurt Hein and
Walter Hein
BY
Mason, Porter, Diller & Stewart,
Attorneys.

INVENTOR.
Kurt R. Schneider
Kurt Hein and
Walter Hein

BY

Mason, Porter, Diller & Stewart,
Attorneys.

ARTICLE FEEDING APPARATUS
Filed July 10, 1956
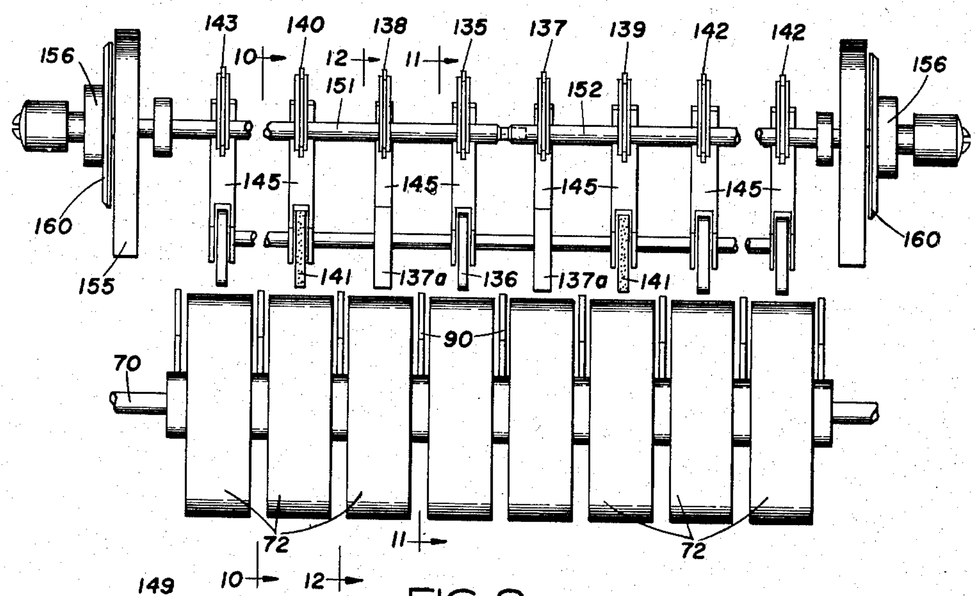
FIG 9
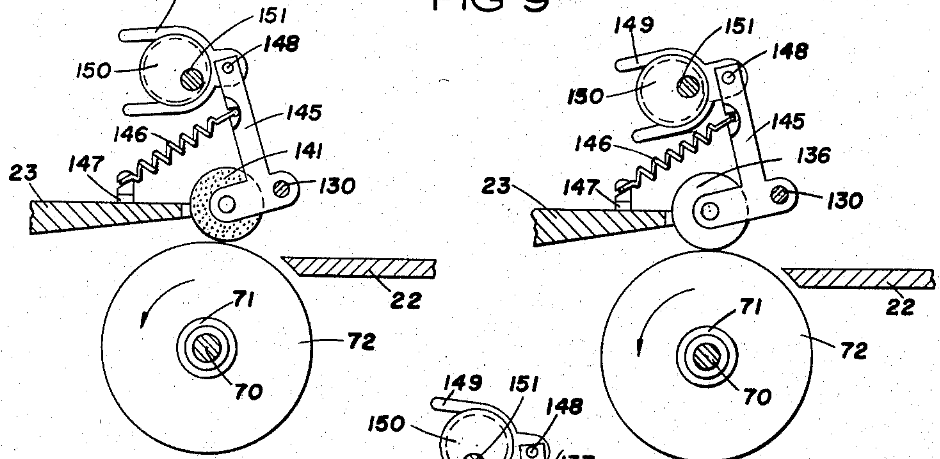
FIG 10
FIG 11
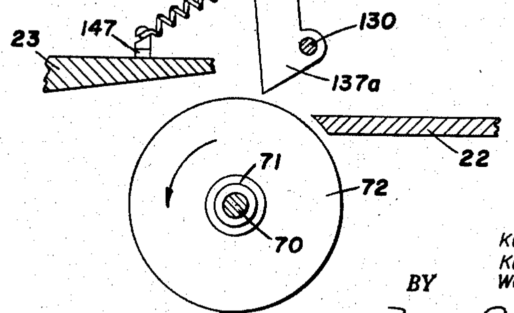
FIG 12
INVENTOR.
Kurt R. Schneider
Kurt Hein and
Walter Hein
BY
Mason, Porter, Diller & Stewart,
Attorneys.

INVENTOR.
Kurt R. Schneider
Kurt Hein and
BY Walter Hein

Mason, Porter, Diller & Stewart,
Attorneys.

ARTICLE FEEDING APPARATUS

Filed July 10, 1956

INVENTOR.
Kurt R. Schneider
Kurt Hein and
Walter Hein
BY
Mason, Porter, Diller & Stewart,
Attorneys.

ARTICLE FEEDING APPARATUS

Filed July 10, 1956 9 Sheets-Sheet 9

INVENTOR.
Kurt R. Schneider
Kurt Hein and
Walter Hein
BY
Mason, Porter, Diller & Stewart,
attorneys.

United States Patent Office 2,907,567

Patented Oct. 6, 1959

2,907,567

ARTICLE FEEDING APPARATUS

Kurt Rudolf Schneider, Bainbridge, Kurt Hein, Binghamton, and Walter C. Hein, Vestal, N.Y., assignors to Eureka Specialty Printing Company, Scranton, Pa., a corporation of New York Application July 10, 1956, Serial No. 596,980

29 Claims. (Cl. 271—35)

This invention relates to apparatus for feeding articles and is particularly useful for cards, folders, envelopes, packages and the like.

An object of this invention is the provision of an apparatus in which articles can be delivered one-by-one in a regular succession by feeding and separating devices.

Another object of the invention is the provision of such an apparatus in which a pile or stack of articles is agitated during feeding and separating operations.

Another feature is the provision of such an apparatus in which articles are delivered in a regular succession, from a pile or stack and then taken by a further feeding mechanism operating at a higher linear speed, with provision of means by which the speed differential does not produce excessive tensions in an article being fed.

A further feature is the provision of an apparatus in which articles are delivered in a regular succession from a pile or stack, with control of the timing of the individual feedings, and with devices by which the stack is agitated during the operation of feeding an article.

A further feature is the provision of an apparatus in which articles of irregular thickness are delivered in a regular succession from a pile or stack, by feeding and separating devices, these separating devices being adjustable to accord with differences of thickness in the individual article.

A further object is the provision of an apparatus in which articles are delivered in a regular succession from a pile or stack, by feeding and separating devices, these separating devices being in part active upon several lowermost articles of the stack, and in part being differentially active at the advancing edge of the lowermost article of the stack for detaining it until a receiving mechanism is in condition for accepting it.

With these and other objects as features in view, an illustrative form of practice of the invention is shown on the accompanying drawings, in which:

Fig. 9 is an upright view substantially on lines 9—9 of Figs. 3 and 5A, showing feeding and separating devices in elevation, and with frame parts omitted for clearness;

Figure 2:
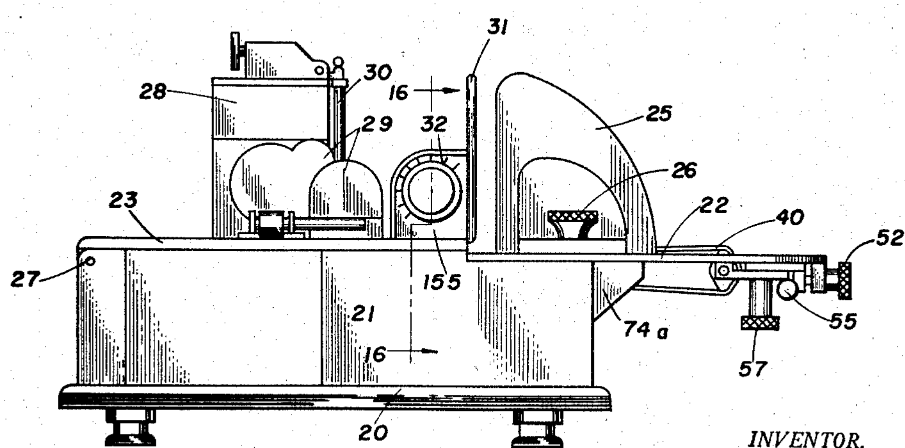
Fig. 2 is a corresponding side elevation.
Figures 3, 18:
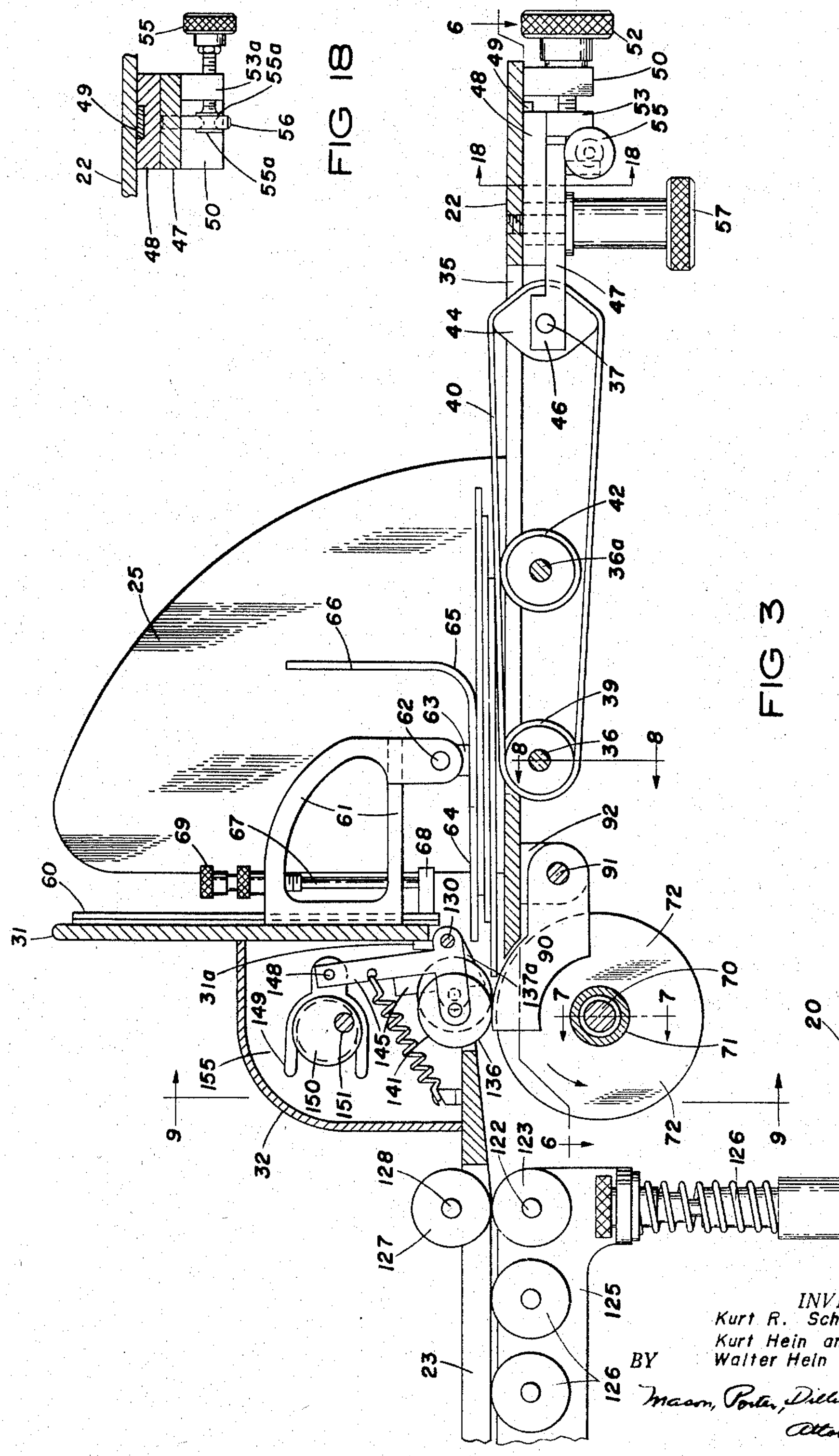
Fig. 3 is an upright section substantially on line 3—3 of Fig. 4, and on a larger scale than Figs. 1 and 2.
Figure 13:
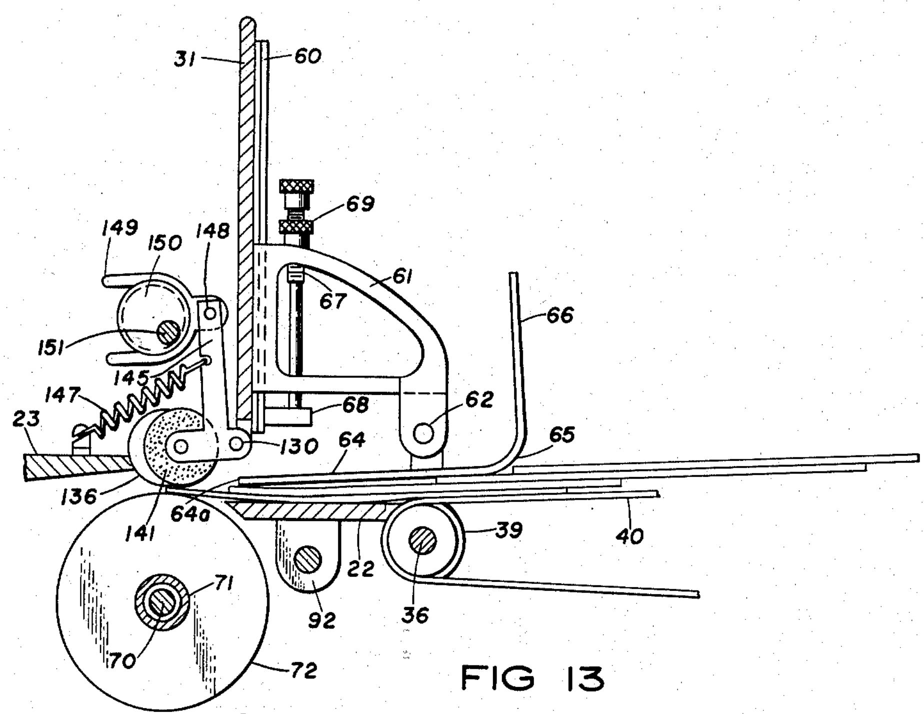
Figure 14:
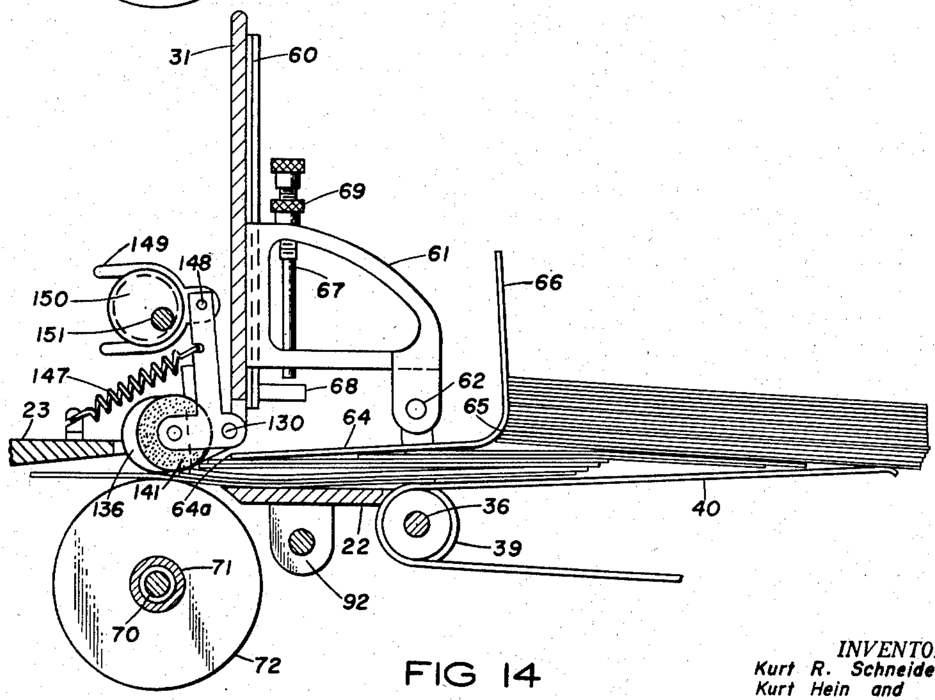
Figure 15:
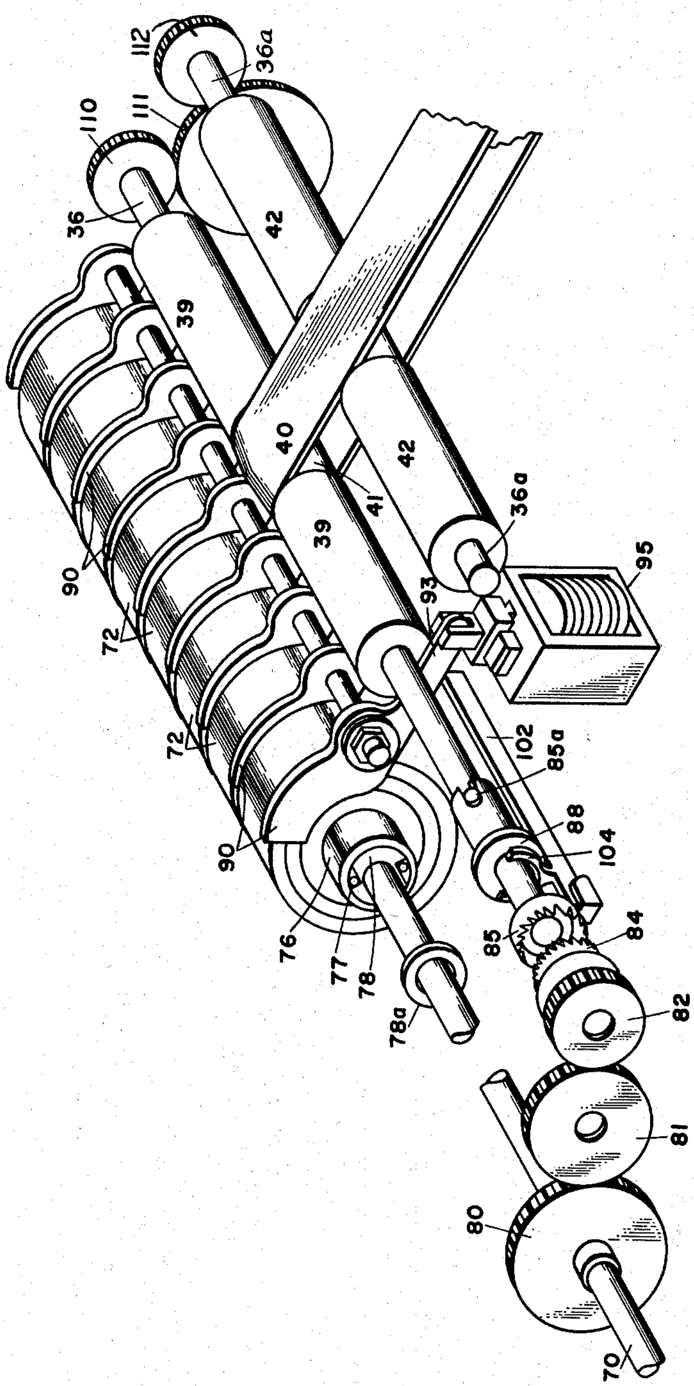
Figure 16:
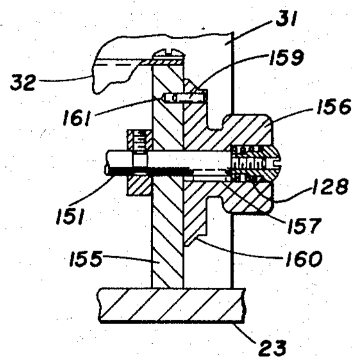
Figure 17:
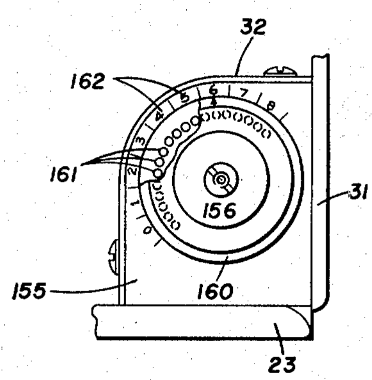
Figure 19:
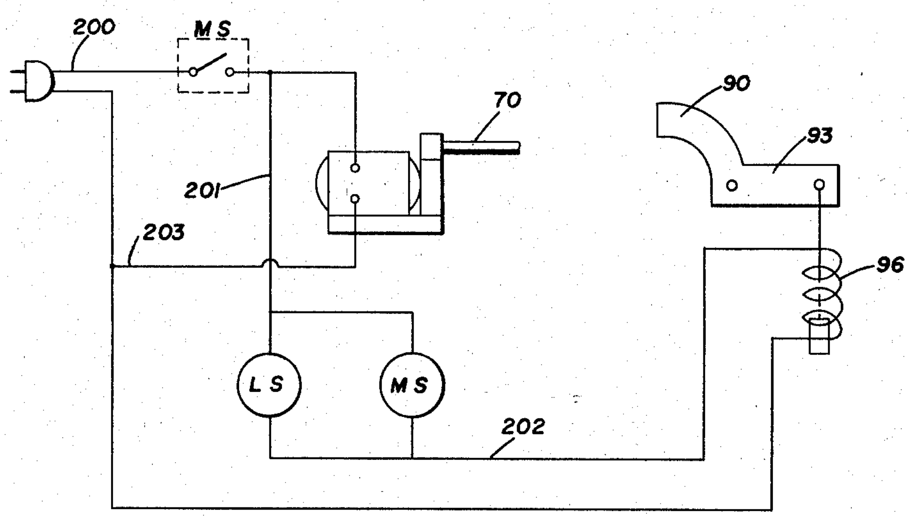

Figs. 10, 11 and 12 are respectively sections on lines 10—10, 11—11, and 12—12 of Fig. 9;

Figs. 13 and 14 are sections showing the separator parts of Figs. 10–12 and pre-separator structures of Fig. 3, in different positions during article feeding operations;

Fig. 15 is a perspective view of the feeding devices, showing the driving and operating connections thereof;

Fig. 16 is an upright section, on a larger scale, substantially on line 16—16 of Fig. 2, showing one of the adjustment devices for controlling the eccentric shafts;

Fig. 17 is a side elevation of the structure shown in Fig. 16, with parts broken away;

Fig. 18 is an upright sectional view substantially on line 18—18 of Fig. 3, of the belt adjustment structure;

Fig. 19 is a circuit diagram.

Figure 1:
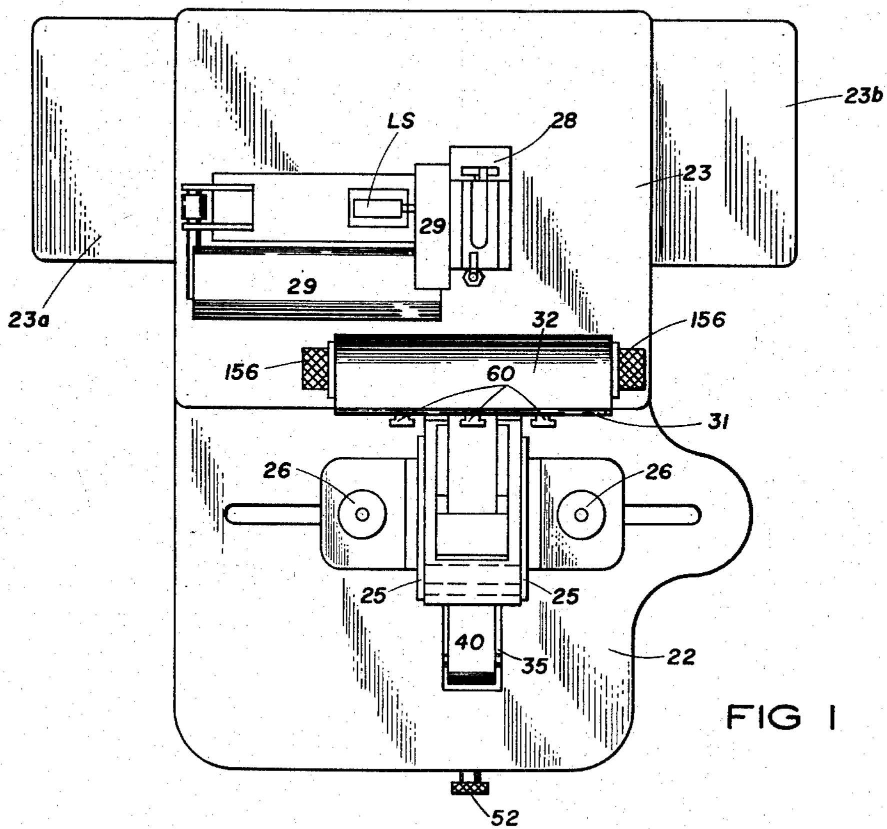
Fig. 1 is a plan view of a machine according to the invention.

In Figs. 1 and 2, the invention is illustrated as used in a label-applying machine having a base 20 with walls 21 extending upwardly therefrom, and a front stack or hopper table 22 and a rear table 23 upon which a strip or sheet of labels may be placed. This rear table 23 may have separable extensions 23*a*, 23*b* for supporting the labels.

In this illustrative employment of the feeding and separating structures in a mechanism for applying labels to the articles being fed, the Schneider copending patent application Ser. No. 285,386, filed May 1, 1952, now Patent No. 2,754,022, shows such a mechanism in which articles are individually supplied with labels which are caused to adhere thereto, and reference is herein made to structures set out and disclosed in said copending application, in which cards, envelopes or other articles in a stack or pile are individually fed from the bottom of the stack by devices including a control finger which is electromagnetically actuated and in one position serves to prevent the feeding of an article and in another position to permit such feeding; punching devices for separating a label from a strip or sheet and delivering the same onto an article passing beneath the punch; an article-sensitive element for determining the application of the label at a predetermined distance from the leading edge of the article; and interlocking devices by which no article is fed when there is no label available for application thereto, and in which no label is delivered by the punch unless there is an article for receiving it.

Figure 4:
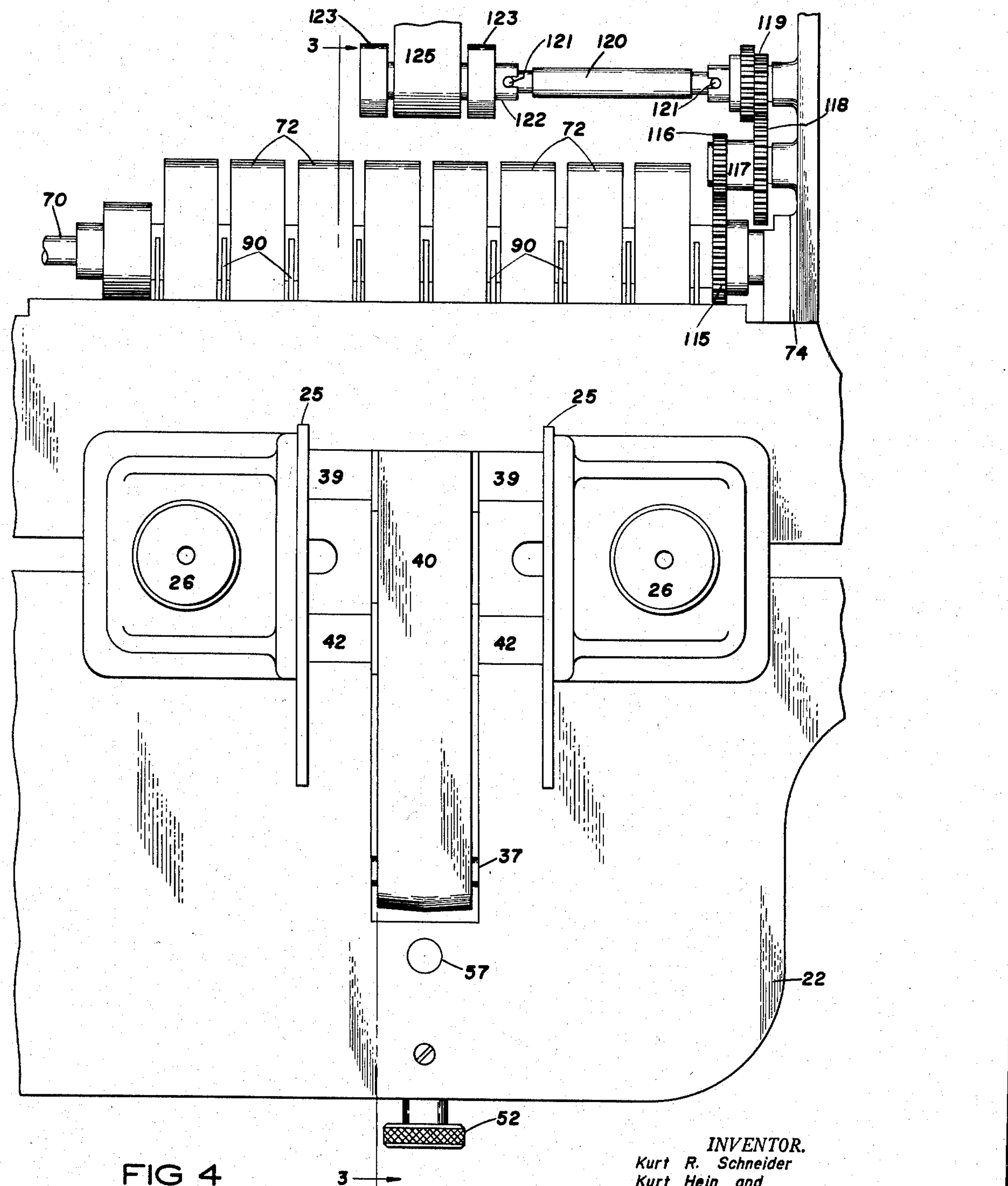
Fig. 4 is a plan view of a part of the machine, on the scale of Fig. 3, with one upper table structure having been raised to show parts located thereunder.
Figure 5:
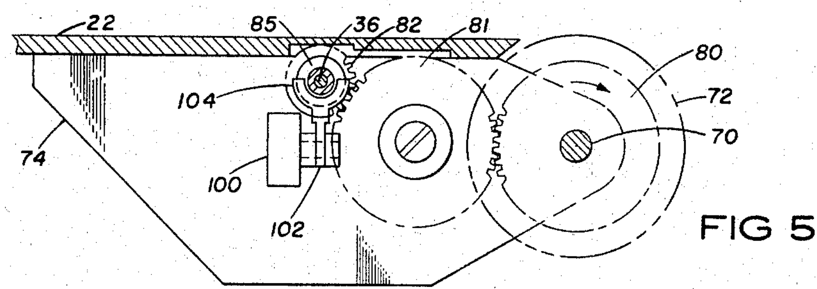
Fig. 5 is a fragmentary section substantially on line 5—5 of Fig. 6.
Figure 5A:
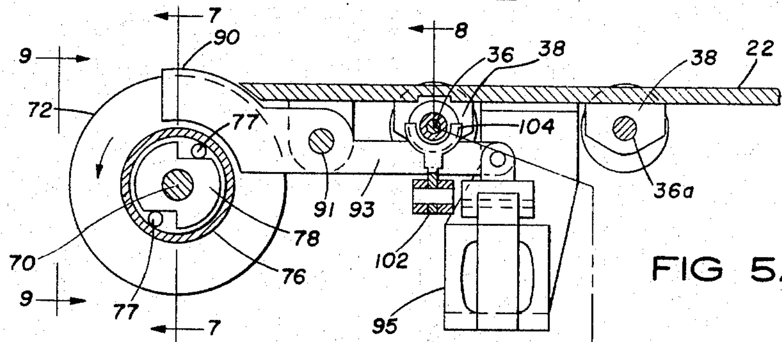
Fig. 5A is a fragmentary section, substantially on line 5A—5A of Fig. 6, showing a part of a hopper table, and devices located beneath the same.

In the machine shown on Figs. 1 and 2, correspondingly, adjustable side guide plates 25 are provided on the hopper table 22, and being fixed in position by clamp nuts 26 at distances corresponding to the widths of the stack of articles, to provide for lateral positioning of the individual articles as they are to be moved forward for the application of the labels in this illustrative employment. The rear table 23 is mounted on a horizontal pivot 27, so that this rear table with the parts thereon may be raised, therewith exposing elements located therebeneath, as shown in Fig. 4. The elements on the rear table 23 include a punch housing 28, covers 29 extending over power transmitting means by which the punch may be operated, and wetting devices including a valved duct 30 by which water may be passed and delivered (by means not herein shown) onto a defined area of the top of a passing article.

The rear plate 23 includes (Figs. 2 and 3) an upstanding wall 31. The table 23 and the upright wall 31 are fixed rigidly together and support a cover 32 extending over separating devices which will be described in detail hereinafter.

Figure 6:
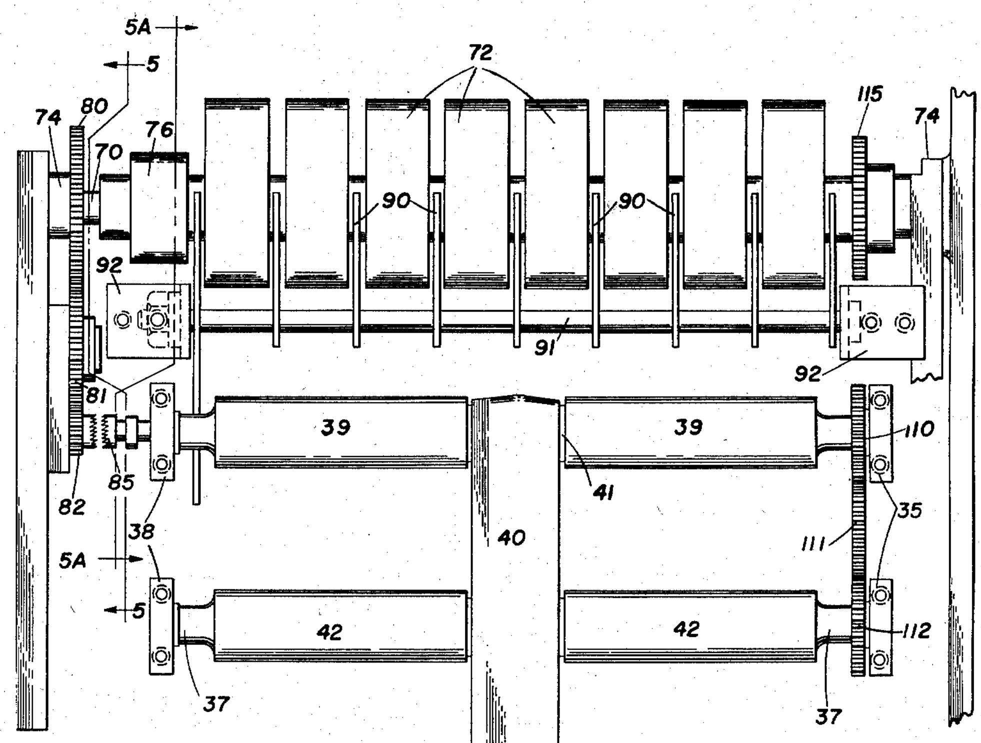
Fig. 6 is a horizontal section substantially on line 6—6 of Fig. 3, with table parts omitted.

In Figs. 1, 2 and 3, an aperture 35 is provided in the front or hopper table 22 and shafts 36, 36*a*, 37 are provided beneath the top surface of table 22. The shafts 36, 36*a* are supported by bearing blocks 38 (Fig. 6)

secured to the bottom of table 22. Shaft 36 has portions 39 presenting a non-slipping surface, for example by having rubber coverings, these portions 39 being spaced apart near the mid-point between the corresponding bearing blocks 38, for receiving an endless belt 40. The portion 41 of shaft 36, located between the ends of its portions 39 is preferably crowned with a high center (Figs. 6 and 8) for controlling the lateral position of the belt 40. The shaft 36*a* has corresponding portions 42 with frictional surfaces such as provided by rubber coverings, these being spaced at the center, to accommodate the belt 40. The belt 40 and the thicknesses of the coverings 39, 42 are so related that the central part of the belt is at the elevation of the extension of the general cylindrical surface of the parts 39, and the belt in its lowermost position above shaft 36*a* is likewise alined with the upper generatrix of the cylindrical form of the portions 42.

At its front end, the belt 40 passes over an oblong, i.e. non-round, turning roller 44 which has a greater dimension diametrically along one axis than along an axis at right angles thereto, as shown in Fig. 3: the general shape being so selected that essentially the same tension is exerted upon the flights of the belt 40, regardless of the position in rotation of the turning roll 44, but with the upper flight of the belt 40 being moved up and down relative to the table 22. The roller 44 is preferably crowned (Fig. 6). The turning roll 44 is mounted on shaft 37 (Figs. 3 and 6), and this shaft is supported on the bifurcated ends 46 of a support 47 which can rock relative to a sliding block 48 which is movable along a guide rail 49 secured to the bottom of the table 22. A downward projection 50 from the table 22 has an aperture in which can rotate the threaded stem 51 of an adjusting screw having a head 52: the stem 51 is threadedly engaged in the projection 53, so that upon rotating the head 52, the sliding block 48 and therewith the support 47 can be adjusted in its distance from the shaft 36, thereby controlling the tension in the feed belt 40. Projections 53*a* from the sliding block 48 support (Fig. 18) an adjusting screw 55 having spaced collars 55*a* for receiving the downwardly projecting pin 56 which is fixed in the support 47, so that upon rotating the screw 55, the position of the pin 56 is shifted laterally beneath the table 22 and therewith the angular position of the support 47 can be shifted relative to the pivot provided by the stem of a clamping screw 57 which is threadedly engaged at its upper end in the table 22, and passes through a longitudinal slot 48*b* in block 48, and which has a flange 57*a* effective for clamping the support 47 and the sliding block 48 against accidental movement. As shown in Fig. 6, the support 47 has slots 47*a* for receiving pins 48*a* fixed in the sliding block 48, so that the tension adjustment by screw 52 can be attained with the clamping screw 57 released, and then fixed by tightening the screw 57. This adjustment structure permits regulation of the tension in the belt 40, and also regulation of the angular positioning of the oblong roll or pulley 44 relative to the longitudinal direction of the belt for thereby controlling the accuracy of its movement between the friction roll portions 39, 39 and 42, 42.

The front face of the upright wall 31 of the hopper structure has rigidly mounted thereon a number of T-rails 60 (Figs. 1 and 3) which support a vertically sliding bracket 61 and guide the same in its movement. In the illustrated form, the bracket 61 is about 3 inches wide, so that postal cards may be supplied and fed with the guide plates 25 spaced at, say, 3⅜ inches to allow free movement of the cards which are 3¼ inches wide, but providing guides for supporting the pile and preventing excessive lateral deviation: and this bracket 61 is shown engaged with a central T-rail 60, so that the stack or pile overlies the belt 40 and is centered with respect thereto, for the following illustrative description of operation. This same bracket 61 can be employed with envelopes or folders of greater width, and in such cases can be positioned upon a different T-rail 60 if such positioning is found to give great control of cocking or twisting of the individual article about an upright axis, as for example when the label is to be applied adjacent one edge of the article, noting that the label is placed upon a part of the article essentially at an area thereof which overlies the belt 40 during the initial feeding. A wider bracket 61 can be employed for wider articles, and the use of more than one bracket 61 upon respective T-rails 60 is within the purview of this disclosure.

The bracket 61 projects toward the position of a pile of envelopes or cards (Figs. 13 and 14) and has a horizontal pivot 62 positioned for movement in an upright plane above the axis of shaft 36. This pivot 62 supports the lugs 63 fixed on the lower leg 64 of an L-shaped rockable preseparator member having at its front a portion 65 leading to an upright leg 66. The L-shaped member 64, 65, 66 illustratively has the same width as the bracket 61, but its width may be made greater as described above for the bracket 61. In the illustrative form, the portion 65 has an outward, article-engaging surface which is rounded or cylindrical with a radius of about ⅜ inch, that is, the radius is greater than the thickness of the thickest articles to be separated thereby, here illustratively pamphlets of ⅛ inch thickness: the maximum curvature radius is determined by the space at the final separator structures described below, for receiving a group of articles which have not been separated during passage to such final separators. The horizontal leg 64 extends (Fig. 3) rearwardly to a point approximately beneath the upright wall 31. In the presently preferred arrangement shown by the drawings, the L-shaped preseparator member 64, 65, 66 is of sheet metal with its leg 64, 66 at right angles to one another, and with the rear or trailing edge 64*a* of the lower leg 64 having a distance from the upright plane of the pivot 62 which is twice the distance of the leg 66 in front of such plane. The member 64, 65, 66 is preferably so formed that the parts in front of and behind the pivot plane are essentially poised or evenly balanced.

A spindle 67 is threadedly engaged in the bracket 61 and extends downwardly for engagement with a projecting lug 68 on the wall 31, so that the leg 64 can be lowered into contact with the belt 40, or held thereabove at the lower limit of travel of the preseparator structure: this adjustment being determinable by rotating the spindle 67: and then fixing the same by a lock nut 69. The assembly of the bracket 61 and the preseparator member or rockable shoe 64, 65, 66 has both weight and mass effects, as described hereinafter; with the function of separating the pile or stack into groups of one or more articles for advancement to the final separator devices.

Figure 7:
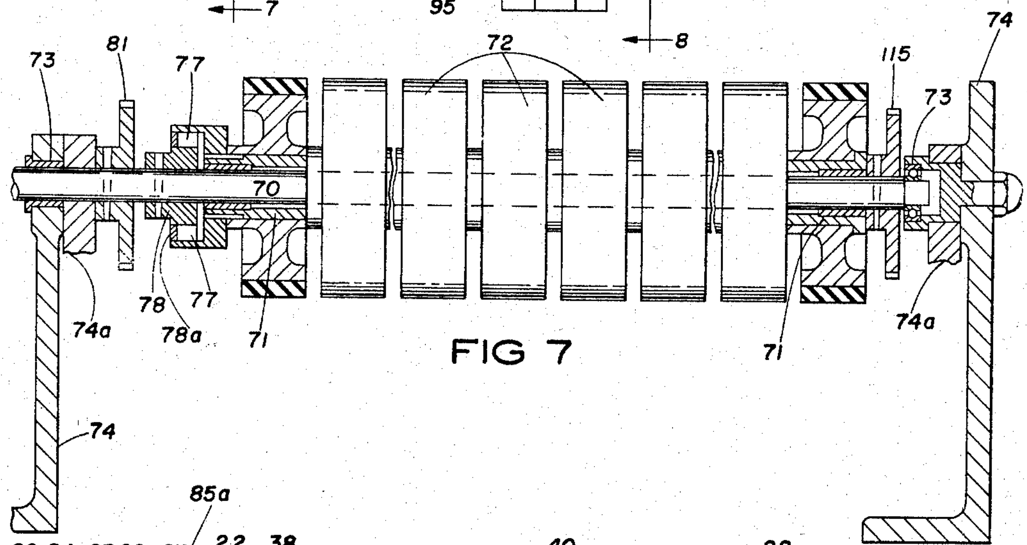
Fig. 7 is an upright section substantially on lines 7—7 of Figs. 3 and 5A.

A transverse shaft 70 (Figs. 3, 4, 5, 5A, 6, 7 9–15) has mounted thereon for relative rotation a concentric sleeve shaft 71 upon which is fixedly mounted a main feed roll 72 formed by a number of rubber-surfaced elements, spaced individually apart. The shaft 70 is supported beneath the table levels by bearings 73 carried by standards 74 extending from the base 20. During operation of the illustrative mechanism, power is supplied to this shaft 70 to maintain it constantly in rotation in a counterclockwise direction (Figs. 3, 5A, 10–14). Fixed to the sleeve 71 is a collar 76 (Figs. 5A, 6 and 7) having a projecting cylindrical flange within which are provided rollers 77. Fixed to the shaft 70 is a collar 78 having notches provided by angular walls for cooperating with the rollers 77 and therewith with the flange of collar 76, to provide an overrunning clutch arrangement. Thus, during the idle running of the machine, the shaft 70 acts through the overrunning clutch to compel the sleeve 71, and therewith the main feed roll 72, to turn at its own speed: but when, during operation of the mechanism, an effort is exerted which tends to move the main feed roll 72 faster than the angular speed of the shaft 70, the overrunning clutch parts disengage and permit this overdrive of the main feed rollers. A disk 78*a* on the collar 78 prevents escape of the rollers 77.

The shaft 70 has fixed thereto a gear 80 (Figs. 5, 6, 7 and 15) which is in mesh with an idler 81 supported on the frame, and this idler in turn is in mesh with a gear 82 (Figs. 5, 6, 8 and 15) rotatably mounted on a bearing bracket 74*a* (Fig. 8) for rotation coaxially with the shaft 36. A screw 83 supports the gear 82 and its cylindrical extension 84 which is provided at the free end with triangular clutch teeth. Mating clutch teeth are provided on the sliding sleeve 85 (Figs. 8 and 15) mounted on the shaft 36 and having a slot for receiving a driving pin 85*a* whereby the sleeve 85 and the shaft 36 turn together but have relative sliding movement. A spring 87 reacts against a bearing block 38 on the one hand, and against a flange 88 of the sleeve 85, for urging the clutch teeth into engagement, whereby to establish a drive from the shaft 70 through gears 81, 82, and thus to the shaft 36. The triangular shapes of the interengaging clutch teeth permit the teeth of the sleeve 85 to ride upon the teeth of the gear extension 84, against the action of the spring 87 when effort is exerted upon the shaft 36 to rotate it faster than the extension 84.

The main feed roll 72 has its surfaces spaced axially for receiving article-control fingers 90 (Figs. 3, 6 and 15) which are fixed to a common rock shaft 91 supported by bearing blocks 92 fixed on the lower surface of the table 22. An arm 93 is also fixed to the rock shaft 91, illustratively being integral with one of the feed fingers 90, and has a loose pivot connection at its free end to the core 94 of a solenoid structure 95 having a coil 96. Thus, when the coil 96 is energized, the core 94 is raised and the arm 93 is moved counterclockwise, and therewith the article feed-control fingers 90 are lowered into article releasing position: when the solenoid coil 96 is deenergized, the core 94 is lowered with the arm 93 and the fingers 90 move upward in the spaces between the parts of the main feed roll 72 and prevent articles from being moved forward.

Figure 8:
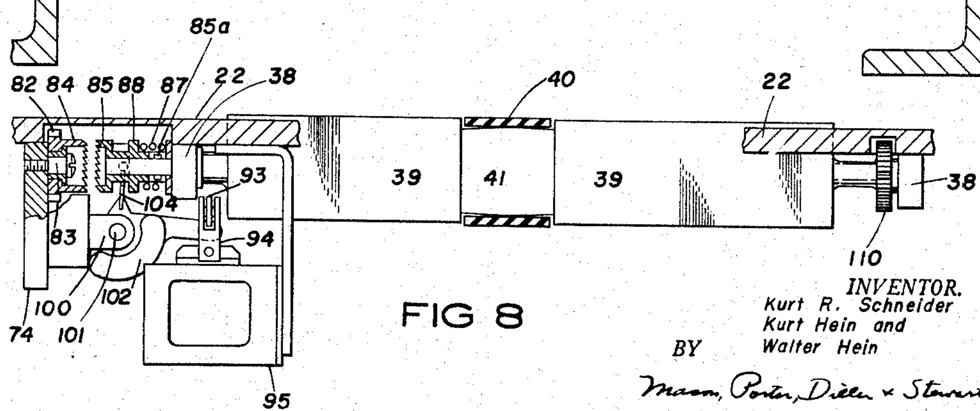
Fig. 8 is an upright section substantially on lines 8—8 of Figs. 3 and 5A.

An extension 100 of a bracket plate 74*a* supports a horizontal pivot 101 for a rock lever 102 (Figs. 8 and 15), which has an end beneath the arm 93, so that upon downward movement of the arm 93, the rock lever 102 is moved clockwise in Fig. 8. The rock lever 102 has an upward extension 104 engaging around the sleeve 85, so that during its clockwise movement in Fig. 8, the extension 104 engages the flange 88 and moves the sleeve 85 for separating the clutch teeth against the action of spring 87. Thus, the solenoid 95 simultaneously controls the permissive feeding of articles by the main feed roll 72, and the power driving of the shafts 36, 36*a* and the belt 40.

The shaft 36 has, at its end away from the sleeve 85, a gear 110 in mesh with an idler 111 which in turn drives a gear 112 fixed on the shaft 36*a* carrying the cylindrical and frictional feeding surfaces 42 (Figs. 6 and 15) whereby the friction surfaces 39, 42 are driven in the same direction and at the same surface speed, this also being the speed of movement of the upper flight of the belt 40.

In the illustrative structure, the shaft 70 has, at the end away from the sleeve 77, a gear 115 which (Fig. 4) is in mesh with a small gear 116 secured on a sleeve 117 with a larger gear 118, this larger gear being in mesh with a gear 119 carried by a stub shaft 120 and thus serving to drive a swinging shaft 120*a* and thus through universal joints 121 to turn the shaft 122 having the stage feed rollers 123 secured thereto (Figs. 3 and 4). The shaft 122 is supported by a stage 125 which is pressed upwardly by springs 126 as shown in the aforesaid patent application, one of which is illustrated in Fig. 3. The swinging shaft 120*a* and the universal joints permit upward and downward movement of the stage frame 125 with constant driving of the stage constant-drive rollers 123 which may be in driving connection, for example, as in the copending application, with the further stage rollers 126. Upper pressure rollers 127 may be provided on a horizontal shaft 128 carried above the table 23, with the rollers 127 located above the first stage rollers 123 (Fig. 3). The gear 129 on stub shaft 120 is connected for driving a gear (not shown) on shaft 128 so that the stage rollers 123 and the top pressure rollers 127 turn at the same surface speeds. The ratios of gears 115—116 and 118—119 are so selected that the rollers 123, 127 turn at a greater surface speed than the main feed roll 72.

As shown in Figs. 3 and 9–12, a pivot 130 is supported by the table 23 and wall 31 and extends horizontally above the rear edge of the feed or hopper table 22, and provides a pivot mounting for a number of separator devices which can individually turn freely thereon. In the illustrative form of Figs. 9–12, three types of separator devices are shown, comprising a central device 135 (Figs. 9, 11), having a freely rotatable metal wheel 136 (Fig. 11) and providing a top pressure roll above the main feed roll 72 for cooperating therewith when an article has been released for feeding; two stripper devices 137, 138 (Fig. 12) each having a downwardly inclined surface 137*a* for engagement with the advancing edges of envelopes to be fed; and two devices 139, 140 (Fig. 10) which include friction stone wheels 141 that are normally detained against rotation but may be released and turned in event of wear. Further, devices 142, 143 identical with the pressure roll 136 (Fig. 11) and of like function, are provided between the devices 139, 140, and the respective ends of the pivot rod 130. It will be noted that above each section of the main feed roll 72 is provided one of the devices 135, 137, 138, 139, 140, 142, 143, with the device 135 above a part of roll 72 which is alined with the belt 40 and the stage 125 (Fig. 4) and the other devices arranged symmetrically in either direction therefrom.

These final separating devices are shown in Figs. 10–12 as each including a lever member 145 pivoted on the rod 130 and having a portion to which is connected a tension spring 146 which at its other end is engaged with a respective pin 147 fixed on the upper surface of the table 23. At its upper end, each of the levers 145 supports a pivot 148 for a bifurcated piece 149 which extends around a circular eccentrically mounted disk 150 fixed on one or the other of the adjusting eccentric shafts 151, 152 (Fig. 9), with these eccentric disks thus forming adjustment eccentrics so that upon rotation of the shafts 151, 152, the corresponding lever arms 145 can be rocked clockwise in Figs. 10–12 by the action of the respective eccentric disk 150, or can be moved counterclockwise by the action of the respective spring 146, by a distance determined by the position to which the eccentric disk 150 has been moved.

As shown in Figs. 10–12, the lever arm from the pivot rod 130 to the wheel axis, is greater for the pressure wheels (Fig. 11) than for the friction stones (Fig. 10) so that the pressure wheels 136 overlie the main feed roll 72, the axes normally being in a vertical plane, while the axis for the stones 141 is forward of this plane by a distance which was ¼ inch in an operative machine and which brings the effective part of the respective friction stone forward of such plane. The stripper members 137, 138 (Fig. 12) have upper parts of their inclined surfaces forward of the operational parts of the respective friction stone so as to encounter the edges of upper articles which are simultaneously fed thereto, and the lower ends of these surfaces (Figs. 12–14) were 7/16 inch in front of the said plane in an operating machine. It is preferred to have the eccentric disks 150 differently oriented on their respective eccentric shafts 151, 152: thus as shown in Figs. 10–12, with the eccentric shafts set at "zero" adjustment (Figs. 16 and 17), the plane through the axes of the pivots 148 and the shafts 151, 152 was about 14 degrees counterclockwise from horizontal for the pressure wheels 136 (Fig. 11); about 4 degrees so counterclockwise for the friction stones (Fig. 10); and about 6 degrees clockwise from horizontal for the strippers (Fig. 12). At this "zero" adjustment, the lower ends of the stripper surfaces were about ⅛ inch above the surfaces of the feed roll 72, and the latter in the operative machine extended ⅛ inch above the plane of the table 22.

As shown in Figs. 2, 9 and 17, the end walls 155 for the cover 32 support the ends of the eccentric shafts 151, 152. One of the shafts (Fig. 9) has a reduced inner end which fits within a bearing hole in the other shaft, so that coaxiality is maintained. At their outboard ends, outside the end walls 155 (Figs. 15 and 16), the shafts 151, 152 have individual sliding sleeves 156 which are mounted for sliding movement relative to the respective shafts 151, 152, but are prevented from relative rotation by the pins 157. Springs 158 are provided for urging the sleeves 156 inward toward the end wall. A locating pin 159 is provided on each of the flanges 160, for entering into a selected one of the holes 161 of the respective end plate 155, whereby to fix the sleeve 156 and therewith the respective shaft 151 or 152 against rotation, with the cams 150 in a correspondingly selected position. It is preferred to provide a marker upon the flange 160 shown as a part of the sleeve 156, to designate the position then being occupied, in conjunction with indicia 161 provided on the end walls 155. By having the two shafts 151, 152 separate and with a symmetrical arrangement of the groups of devices 137, 139, 142, and 138, 140, 143, and the above separate controls therefor, the positioning of the respective levers 145 can be differentially fixed and determined; for example, an envelope containing contents thicker at one edge than the other can be handled with a uniform tolerance or clearance, and pressure effect, adjacent the two edges, whereby tendency toward rocking or twisting of the article about an upright axis is reduced.

The machine can be operated with the circuit and associated parts described in my aforesaid patent application. A simplified circuit is shown in Fig. 19. The current supply through conductor 200 is effective, when the main switch MS is closed, to drive the electric motor EM, with a return by conductor 203. The motor EM is connected mechanically to drive the shaft 70 at constant speed. The conductor 201 also extends to the switch LS which responds by closing when the article-treating parts are ready, e.g. when a label is present opposite the switch LS. When the switches MS and LS are open, current does not flow by conductor 202 to energise the solenoid 96. The article controlling lever 90, 93 is then positioned with the fingers 90 raised so that the article is arrested. When the switch LS closes, this circuit is energized, and the solenoid moves its core to rock the lever 93, 90; and therewith the fingers 90 release the article so that it is engaged in the nip of the main feed rolls 72 and the pressure rolls 136 and is moved forward along the rest of its path. When it is desired to operate the feeding system without interlock to determine the ready pressure of a label, for example, the hand switch MS can be closed, wherewith the solenoid 96 is constantly energized and the fingers 90 withdrawn: that is, the operation is as though no fingers 90 were provided.

The conjoint action of the feeding and separating devices enables the machine to operate with satisfactory delivery of articles having various size, weight, flexibility, structure and surface conditions. For example, in the illustrative employment in association with a device for individual handling of mail matter, the machine may successively act upon postal cards, folders of one or two folds and held by one or more surface or edge seals, empty or filled small and large envelopes which may have irregular fillings so that the thickness at one part of the envelope area may be thicker than at another; catalogs or magazines having stiff back bindings, etc. In operation, the attendant may place a pile of 6 or 8 inches of such articles upon the belt 40, or the pile may become exhausted; wherewith there is a wide variation of the weight superimposed upon the lowest article. Postal cards provide an essentially "solid" mass when handled in fresh condition from delivery boxes, and may have some interlacing at the edges due to burrs formed in severing due or to distortion during handling. Envelopes have irregular thicknesses at various parts of their areas, so that a pile thereof may be unsteady; the folds may have elasticity so that the pile can be compressed to smaller thickness and then return when the pressure is removed—a condition sometimes referred to as "sponginess;" and the individual envelopes may be limp and flexible if empty or relatively stiff and inflexible if sheets or cards are therein. Frequently envelopes with advertising matter therein may have an article enclosed which is smaller than the envelope area but which supplies much of the package thickness at the region it occupies. Various surface conditions are encountered, from very rough to extremely smooth and slick; from very hard and impervious with a sized and glazed stock to very yielding and porous with unsized pulp stock. The various stocks behave differently as atmospheric humidity increases or decreases; and freshly-opened packages of envelopes, for example, which have been partly protected by the wrappings against humidity change, may behave differently from like envelopes which were unpacked on a previous day. Likewise, with dry materials, the separation of units in a pile may cause static electrical conditions which create trouble. All of these factors contribute to differences in behaviors; and the machine is expected by the mailing room to perform upon successive runs of such different articles with minor adjustments for widely varying materials.

The feeding and separating devices comprise elements which urge the articles forward, and elements which act to allow the lowest article to advance while exerting restraining influences upon super-imposed articles at successive points of the path of advancement, all contributing to the holding back of the upper articles while the lowest only is left relatively free to be advanced.

As one example of practice, with postal cards, the adjustment of the sliding mass 67 is so set that with the mass at its lowest position, one card can move freely between the bottom leg or sole 64 of the shoe and the belt 40 and the rear table roll surfaces 42; with two cards as a group, there is minor friction upon the upper card; and with three cards, a strong frictional effect is exerted while the belt is at a standstill and the cards are forced beneath the shoe sole 64; and the mass is lifted from the adjustment stop when four cards are so forced along the belt.

It will be assumed that the driving motor EM is running, with no articles on the belt, and that switch MS is closed so that the feed belt 40, main feed roll 72 and table rolls 39, 42 are running continuously. If a single unbent card is now placed on the belt, the belt will draw it beneath the shoe and against the main feed roll 72, being directed upwardly thereby; the stones are adjusted so that the leading edge of this card is guided beneath them; and the card then passes to the first stage rolls 123 and beneath the upper pressure rolls 127, which are turning at a greater surface speed than the main feed roll 72 and hence the card is drawn forward more rapidly, with the main feed roll 72 being turned faster by the card friction than by the power drive through shaft 70 from the motor EM, this being permitted by the over-running clutch 76, 77, 78. If the article control fingers 90 have been raised by the arm 93, the drive to the table feed system of the belt 40 and rolls 39, 42 is also opened at the clutch teeth on members 82, 85, so that this system may also be caused to move by the traction along the article which is engaged with the stage rolls 123 and to the pressure rolls 127. Likewise, if the clutch teeth are still engaged, the traction tends to turn the table feed system and provoke separation in the clutch against the action of the clutch spring. This freedom of the feed devices to respond to traction by the article is particularly of value with longer articles having rough lower surfaces, because the lesser pull causes great accuracy and regular advancement by the stage system, less friction between article and the separator feed system so that there is no damage to the article or to feeder parts, and a better control is exercised in the separator system.

If two cards are so inserted as a stack or pile, the doubled weight pressure has little effect and the lower card moves forward as before; but the upper card encounters a small frictional resistance from the rockable shoe or pre-separator by reason of irregularities of the surfaces of this card and by changes of its presentation due to the jigging or wobbling effect of the belt, wherewith minor rocking of the shoe may occur. Usually this upper card is held back by the shoe action, so that the lower card passes through as before, with the upper card moving with it but usually more slowly; but if advanced to the stones, the upper card encounters these at higher points thereof than the lower card and is detained directly thereby so long as the lower card is beneath it. When a deeper stack or pile of postal cards is placed on the belt, a breaking or fanning action occurs. The belt rocks the stack upward and downward, and draws the lowest card forward as before. The superimposed cards tend to follow the lowest card, until stopped by the rounded edge of the pre-separator. Therewith if the frictional resistances at the successive interfaces of the cards are uniform, the cards are successively combed back by this rounded edge, the lowest card being carried forward, the second card moving until its edge encounters the upwardly bent part of the lowest card adjacent the main feed rolls or even until it encounters the stones, while the third card may be detained at the rounded edge; noting that the third card tends to lift the edge by wedging under it as the cards are carried forward by the frictions of the successively underlying cards. As the edge rises, the pre-separator turns about its pivot and its trailing edge is forced downward, thus exerting greater pressure upon the card or cards beneath it and acting to increase the frictional resistance against forward movement of the upper card or cards, while the lowest card is pressed downwardly to increase its frictional contact with the table and feed rolls. When more than three cards are present in the stack, the fourth card may be carried forward by the friction at the interface of the third and fourth cards, so that a higher lifting is performed as the card wedges itself beneath the rounded inlet edge: if earlier cards now underlie the trailing edge of the shoe, this lifting can only occur by lifting of the mass, with disengagement from the stop; and thus as fifth, sixth, etc. cards act beneath the rounded edge with a wedging action, the mass is raised higher and higher, noting that in the preferred and illustrated form the lever arm from the trailing edge to the shoe pivot is greater than the lever arm from the pivot to the effective point of the rounded edge for the particular card, and that such lifting is accomplished by the shoe turning about the trailing edge as a fulcrum so that a major part of the weight effect is being exerted at the rounded edge, with an increase of the slope of the shoe sole 64 as a greater number of cards enter together beneath the rounded edge and an accompanying increase of resistance to the entry.

The radius of the rounded edge should be such that in dimension it is significantly greater than the thickest article to be handled: that is, if one article is beneath the sole of the shoe, then the next article must be able to exert a wedging and lifting effect upon the rounded edge. Further, the radius should not exceed the dimension of the thickness of a piled group of articles which can be successfully handled at the main separator structures, as will be described hereinafter. By way of illustration, the above-described rounded edge, having a radius of its outer surface of ⅜ inch, has been found capable of handling mail matter ranging from postal cards (0.010 inch thick) to advertising matter in envelopes (⅛ inch in total thickness). As successively higher articles in a pile come against the rounded edge, the angle between the plane of the article and the tangent to the rounded edge at the line of contact becomes greater, so that at some height of pile for the given material, the force transmitted from the belt and table rolls, through the frictions at interfaces below such height, is insufficient at such angle to cause a wedging movement by the article and a corersponding further lifting of the mass, because at some underlying interface the friction is insufficient to transmit the necessary force, and the pile then pre-separates at this interface, with the articles below this interface moving forward and the articles thereabove being detained. This pre-separation may occur at any level up to such maximum, and in practice varies even with a single stack, because the interface frictions vary largely, for example by differences in edge burrs in trimmed stock, air introduction by slippage during handling of a group of articles which are being inserted in the machine, static electrical effects, surface engagement of envelope flaps, friction along the side guide plates, etc. When a very wide range of thicknesses are to be handled by a single machine, shoes having different edge radii may be provided, the broader arcs being employed for thick articles and the sharper ones for thin articles.

The adjustment of the stop spindle 67 for the shoe can be changed to facilitate the pre-separation. With postal cards, it has been found feasible to operate with the shoe in contact with or so close to the belt and table rolls that it is rocked even without a card beneath it. In addition to the effects set out above, in the cooperation of the shoe with the pile of articles, the jiggling upward and downward as caused by the front turning roll 44 of the belt, at the part of the pile forwardly of the table roll 42, causes a rocking or wobbling of the shoe in addition to the general shaking by which a mechanical loosening is being given directly to the pile; and this wobbling of the shoe likewise occurs about its trailing edge normally as the fulcrum, and the wobbling changes the aforesaid tangent angle so that a greater or lesser opposition is presented to the forward wedging movement of a given article in the pile which is contacting the rounded edge. For the articles which encounter the rounded edge below the pivot point, the edge and shoe has a component of motion opposite to the feed direction. This wobbling motion is not regular or harmonic, but varies sharply from lift to drop, so that momentum and inertia effects are being exerted, and the shocks assist in causing pre-separations.

When a few cards, dependent in number upon the stop adjustment, come beneath the pivot of the shoe, the sole of the shoe conforms to the uppermost card so passing, assuming for the moment that the overlying cards are detained at the rounded edge. This group then will normally slide beneath the shoe sole, being advanced by the belt and table rolls until the advancing edge of the lowest card encounters the main feed roll and begins to be lifted thereby; whereupon the upper cards also tend to lift at their advancing edges and therewith lift the trailing edge of the shoe itself, and thus a greater downward pressure is exerted at the rounded edge. In practice, it has been found that with postal cards, as the illustrative article, the preseparating action upon a pile begins at the rounded edge, with groups of one or more cards being advanced from the general upright plane at the rear face of the pile, into contact with the rounded edge: one to three lowermost cards are carried forward by the belt and feed rolls, but successively increasing friction effects are exerted upon these by the pre-separating and separating parts, so that they are successively combed back with respect to one another.

In the course of a run of a pile of several inches of postal cards, for example, the lowermost card is urged forward by the belt and the table rolls until it is lifted by the main feed roll, with the trailing edge of the shoe acting to push it downward so that it frequently is observed as arched downward and even contacting the top of the table, that is, to a position where a greater part of its area engages the rear table roll and the rear end of the belt, so that a greater driving effect is given thereto. Therewith, if the second card overlies it and also is beneath the trailing shoe edge, this edge presses upon the second card and correspondingly increases the friction for detaining the second card while the force for driving the first card is being increased. As the number of cards present beneath the trailing edge of the shoe may increase, they tend more and more to act stiffly at the span between the upward bend of the first card adjacent the main feed roll and the area of contact of this group of upper cards above the rear table roll, and in practice air gaps are observable between cards at this span, indicating that separation has occurred.

What has been described for postal cards is likewise true with folders, empty or filled envelopes, and other mail matter in this illustrative employment, and with other articles: noting that adjustment of the stop or exchange of the shoe for one of a different edge radius or lever-arm ratio may increase the accuracy of pre-separation by reducing the number of articles which may from time to time be fed as a group due to high interface frictions between the members of the group. In practice, it has been found that when the interface friction is low, the articles will be fed and spread by the pre-separator acting in conjunction with the feeding devices, so that the articles are successively combed back relative to one another beneath the shoe, with their advancing edges spaced back successively by an eighth to a half inch or more: and that when interface frictions are high, groups of not over six or seven cards move as a unit, which can be handled by the final separator devices, whose operation will now be described.

When a single card is being advanced by the table feeding and pre-separator devices, it encounters the main feed roll 72 as already described, and is deflected slightly upward. The adjustment of the separator structures (Figs. 9–12) is set at a point where this card moves, beneath the strippers of Fig. 12 and encounters the stones of Fig. 10 at a very low tangent angle relative thereto adequate to exert an aligning effect if necessary but without major detention thereby. In the above description of operation, the article feed fingers 90 have been assumed to be in lowered and effective position, so that this single card engages the top pressure rolls 136, Fig. 11, of the separator and is caught in the bight, and its feeding is continued by the main feed roll 72 which is moving at the same surface speed as the table rolls 39, 42 and the belt 40, and thus the card is advanced until engaged by the stage and stage pressure rolls 123, 127. As this card advances, the second card is exposed more and more to the table rolls and belt so that ultimately it is being urged to travel at the same speed as the lower card and essentially independently of any friction between these cards. In practice, at some time before the lowest card is gripped by the stage rolls, the second card has usually advanced until its leading edge encounters the stones 141, but at a greater tangent angle than the first card which is passing therebeneath, and this second card is detained by these stones; this second card may have encountered the strippers 137, 138, but, at a desirable adjustment of the separator system, has been deflected along them. If the two cards have advanced together without pre-separation, the second card is engaged and detained by the stones 141. If three cards are so advanced together, with the stated adjustment of the separator, the upper two cards are detained by the stones 141, noting that as the lowest card is being drawn forward, the second card is drawn forward in slight advance of the third card, due to the shape of the stones, and that their shape also represents a greater detaining effect upon the third card than upon the second card. When more than three cards are released as a group without pre-separation, the fourth and higher cards engage the stripper surfaces and are forced downwardly thereby, with a successive detaining and separation action. As the first card is drawn away by the stage rolls, the second card is now urged forward beneath the stones, and tends to straighten from its slightly bent position by its resiliency, so that it now is taken by the main feed roll 72 and is fed to the stage system. The third card adds its stripping action to this movement of the second card. The higher cards which have been detained by the strippers, due to the presence of the lower cards, encounter little friction at their advancing edges and slip easily down along the strippers, adding their effect to the second and third cards in the illustrative example to prevent these cards from remaining at their prevailing high angle engagements with the stones.

The surface speed of the stage rolls is greater than that of the main feed roll, table rolls and belt, so that the lowest article is quickly seized and drawn forward at a rate faster than it and the articles lying thereon have previously been urged. Movement at such increased speed is permitted by the overrunning clutch arrangement; and results in a pull upon the overlying article for bringing it to position of engagement with the stones ready for its own serial advancement by the main feed roll when the first article has cleared this main feed roll. Even with this fully automatic feeding, uncontrolled by the illustrative article feed fingers, the successive articles are spaced apart as they move along the stage, due to the surface speed differences.

In general, the system of feeding, pre-separating, and separating devices may be described as acting by jogging and urging of a pile of articles forward so that lowermost articles can exert a wedging action beneath a pre-separator which exerts a greater detaining effect as more and more articles try to pass toward its trailing edge, with the jogging continuing in effect upon all parts of each article until the front edge of the article is engaged by the main feed roll and its pressure rolls or is detained by the stones or strippers.

To illustrate the behavior when labels are automatically supplied by means as illustrated in Figs. 1 and 2, and described in the copending application, the manual switch MS is left open. As a label is fed beneath the switch LS (Figs. 1 and 19) to position ready for employment, it engages and closes the switch LS. Prior to this event, the article control fingers 90 have been in raised position, detaining an envelope: when switch LS closes, the solenoid 94 is energized, and the fingers 90 are withdrawn, thereby releasing the article for initial engagement between the main feed roll 72 and the pressure rolls 136, 142 and delivery thereby to the stage system as before, whereupon the labelling devices operate as described in said patent application. The intermittent operation of the solenoid 94 adds a further factor of motion to the system, by stopping and starting the belt 40 and rolls 39, 42 abruptly; so that inertia effects are applied to strip lower articles by breaking their interface frictional engagement with higher articles, also to pull the lower articles while upper articles are detained by inertia, and to increase the effectiveness of the mass of the bracket 61 and its shoe by their inertia and the initial frictional resistance to upward sliding of the bracket 61.

This pre-separating system has been found highly effective in permitting a single machine to be employed in handling and individually delivering a wide variety of articles of differing sizes, weights, thicknesses, and surface conditions. Thus, while the machine may be constructed and work satisfactorily upon one article, such as postal cards, in the absence of the bracket 61 and its shoe, it will not then operate satisfactorily for pamphlets ⅛ inch thick, for example, and another machine may be constructed for such pamphlets but not work well with postal cards, thin envelopes or folders: but with the pre-separator parts in place, the same machine will work on the wider range upon suitable adjustment of the eccentrics 150 to control the final separation.

In the separator system, controlled by the eccentrics 150, it is preferred to have the springs 146 for the strippers 145 (Fig. 12) stronger than those for the pressure rollers (Fig. 11) and the stones (Fig. 10): that is, they are thus better able to resist the upper articles when a group of thick, stiff articles is brought against them. The pressure rollers (Fig. 11) preferably have springs 147 stronger in effect than those of the stones (Fig. 10), to assure the nipping and feeding of the successive articles between the pressure rollers 136, 142 and the main feed roll 72, and to hold the edges of the articles down. The springs 147 for the stones (Fig. 10) are so selected in strength that at zero adjustment of the eccentrics 150, for example for postal cards, they do not yield under the pressure of a second or third card overlying the card which is passing: with a maximum strength such that the stones do not delay moving away from the main feed roll 72 until after the leading edge of the article has passed.

It will be understood that the illustrative embodiment and its employment is not restrictive, and that the invention can be employed in many ways within the scope of the appended claims.

What is claimed is:

1. An article feeding apparatus comprising a belt, guides for supporting a pile of the articles upon the belt, a non-round pulley for producing an agitation of articles in the pile, means for releasing articles from the pile in succession, an article advancing device for receiving the articles so released, said advancing device being effective to advance the articles at a speed greater than that of the belt, means for driving the belt and including a device for interrupting the said driving, and means operated with the article releasing means for controlling said interrupting device to effect driving of the belt concurrently with release of an article by said article releasing means.

2. An article feeding apparatus comprising means for supporting and advancing a pile of the articles, a feed roller for receiving the articles from the said advancing means, devices located for cooperation with the feed roller for restraining the articles from being moved by the feed roller, an article advancing device, means for separately driving the feed roll and the article advancing device, with the advancing device normally effective to move the articles at a speed greater than the feed roll, said driving means including an over-running means whereby when an article is in contact with both the feed roll and the advancing device, the said over-running means will yield so that the feed roll will operate at a speed determined by the advancing device.

3. An article feeding apparatus comprising a frame, a main feed roll journalled on the frame, a first pulley mounted on the frame to be rotated about an axis parallel to and adjacent the main feed roll, a non-round pulley mounted on the frame to rotate about an axis remote from the axis of the main feed roll, a belt passing over said pulleys for supporting a pile of superimposed envelopes and like articles and impelling the same toward the main feed roll, the non-round pulley being effective to give the belt and the pile of articles thereon a rising and falling motion at points axially spaced from the said main feed roll, means for guiding the pile of articles as the same is advanced toward the main feed roll, and a device located above the belt at a position relatively between the main feed roller and the non-round pulley for restricting the forward motion of upper articles in the pile.

4. An article feeding apparatus comprising a driven main feed roll, a pressure roll, friction members at each side of the pressure roll, and strippers at each side of the pressure roll and having inclined article-engaging surfaces, means for independently supporting said pressure roll, members and strippers and including springs for urging the same toward the main feed roll, and means for coordinately adjusting adjacent friction members and strippers together relative to the pressure roll.

5. An apparatus as in claim 4, in which the adjustment means includes two independently adjustable elements having devices thereon for controlling the positions of said members and strippers, the member and stripper at one side of the pressure roll being controlled by one element and the member and stripper at the other side thereof being controlled by the other member.

6. An article feeding apparatus comprising a driven main feed roll, a plurality of stripper devices cooperative with the main feed roll and spaced in the axial direction thereof, a plurality of friction devices cooperative with the main feed roll and spaced in the axial direction thereof in substantial alinement with the stripper devices, and two independent adjusting elements for the said devices and including parts for moving the same toward and from the main feed roll, one element being effective upon the devices at one part of the length of the feed roll and the other element being effective upon the devices at another part of the length thereof.

7. An apparatus as in claim 6, in which the said adjusting elements each comprise a shaft, and means for rotating and fixing the angular position of the shaft, eccentrics upon the shafts, and parts moved by the eccentric for moving said separating devices.

8. An apparatus as in claim 7, in which the eccentrics are differently oriented upon the shafts, whereby the relative positions of the separating devices are changed as the shafts are rotated.

9. An apparatus as in claim 6, in which the separator devices include friction and stripper members, levers for independently supporting the members, and said moving parts are effective to vary the relative positions of said members upon movement of the adjusting elements.

10. An article feeding apparatus comprising a support, a main feed roll, separating devices cooperative with the main feed roll, an auxiliary feed roll mounted upstreamward of and rotatable about an axis parallel to the main feed roll, a feed belt upon which a pile of the articles may be supported, a wobble roll for causing upward and downward movements of the belt with the articles thereon, and devices for driving the feed rolls and belt.

11. An apparatus as in claim 10, including a device for preventing the feeding of an article by said main feed roll, means for moving said preventing device between feed-preventing and feed-permitting positions, and a clutch means for interrupting the drive to the belt and the auxiliary feed roll, said moving means being effective to open the clutch when said preventing device is in preventing position.

12. An apparatus as in claim 10, including a device for preventing the feeding of an article by said main feed roll, means for moving said preventing device between feed-preventing and feed-permitting positions, and a clutch means for interrupting the drive to the auxiliary feed roll, said moving means being effective to open the clutch when said preventing device is in preventing position.

13. An apparatus as in claim 10, including a device for preventing the feeding of an article by said main feed roll, and means for moving said device between feed-preventing and feed-permitting positions, and a clutch means for interrupting the drive to the belt, said moving means being effective to open the clutch when said preventing device is in preventing position.

14. An article feeding apparatus comprising a support, a main feed roll thereon, a belt mounted thereon for receiving a pile of the articles and advancing the same toward the main feed roll, means for causing the belt to rise and fall, means for driving the main feed roll and belt, said driving means including a device whereby the drive to the belt may be interrupted, and means for intermittently operating said interrupting device.

15. An apparatus as in claim 14, including a mass mounted on the support for upward and downward movement, and a detaining structure on said mass for preventing the advancing movement of upper articles in the pile and permitting advancement by the belt of a lower article in the pile.

16. An apparatus as in claim 15, in which the detaining structure is L-shaped, with an upright portion for engaging the upper articles, and a horizontal portion for frictional engagement with a lower article which has been brought beneath it by the belt.

17. An apparatus as in claim 16, in which the detaining structure is rockably mounted on said mass.

18. An apparatus as in claim 17, in which the detaining structure has a rounded edge between the said upright and horizontal portions, said edge being effective upon wedging engagement of an article beneath it to rock the structure.

19. An apparatus as in claim 18, in which the horizontal portion has a greater lever arm rearward of its axis of rocking than the lever arm from said axis to the said upright portion.

20. An apparatus as in claim 17, in which the axis of rocking is intermediate the length of the said detaining structure, and the parts in front of and behind said axis are essentially evenly balanced.

21. An article feeding apparatus comprising a support, main and auxiliary feed rolls thereon, means for driving the rolls for advancing articles above an auxiliary feed roll in the direction toward the main feed roll, a mass mounted on the support for upward and downward gravitational movement above a pile of articles, means for advancing the lower articles of the pile toward the auxiliary feed roll, and a detaining structure pivoted on said mass at an axis overlying said auxiliary feed roll, said structure having an upright portion to detain upper articles of a pile and a horizontal portion for frictional engagement with the upper surface of an article located between the said horizontal portion and said auxiliary roll.

22. An apparatus as in claim 17, including adjustable means for limiting the downward movement of said mass relative to the belt.

23. An apparatus as in claim 21, including adjustable means for limiting the downward movement of said mass relative to the said aligned auxiliary roll.

24. An article feeding apparatus comprising a support, a main feed roll having a hollow shaft, a drive shaft within the hollow shaft and mounted on said support, an overrunning device for connecting the shaft and hollow shaft, a final feeding system, and means for driving the shaft and final feeding system, with the said system effective to move an article faster than the main feed roll when the latter is driven by the said drive shaft.

25. An apparatus as in claim 24, in which the driving means includes a speed determining driving connection between the said shaft and said final feeding system.

26. An apparatus as in claim 24, and including auxiliary feeding means for advancing articles to said main feed roll, and driving connections from said shaft to said auxiliary feeding means, said driving connections including a clutch device.

27. An article feeding apparatus comprising a main feed roll, auxiliary feeding means for advancing a pile of superimposed articles toward the main feed roll, preseparator means for detaining the upper articles of the pile when more than a predetermined maximum number of articles is in the pile which is being advanced so that a group of not more than said predetermined maximum number of articles is advanced from the preseparator means toward the main feed roll, and separator devices cooperative with the main feed roll to permit passage of a lowermost article and to restrict forward movement of the overlying articles of said group.

28. An apparatus as in claim 27, in which the preseparator means includes a rockable device wedgedly engaged by the lower articles in the pile and thereby being rocked, said rockable device having a surface for engagement by the wedgedly engaging articles which presents a greater detaining effect after being rocked thereby.

29. An article feeding apparatus comprising a driven main feeding means including a main feed roll, a first turning pulley located to rotate about an axis adjacent to the axis of the main feed roll, a wobble turning pulley for the belt located to rotate about an axis remote from the axis of the main feed roll, a driven belt engaged with said pulleys for supporting a pile of articles and advancing the same toward the main feed roll, and means for adjusting the angularity of the axis of the wobble pulley and its distance from the first pulley.

References Cited in the file of this patent

UNITED STATES PATENTS

| | | |
|---|---|---|
| 15,640 | Beecher | Sept. 2, 1856 |
| 1,457,158 | Gammeter | May 29, 1923 |
| 1,596,489 | Jacquemin | Aug. 17, 1926 |
| 2,273,287 | Rovan et al. | Feb. 17, 1942 |
| 2,273,288 | Rovan | Feb. 17, 1942 |
| 2,339,835 | Burckhardt | Jan. 25, 1944 |